(12) United States Patent
Yoshimi (10) Patent No.: US 11,055,030 B2
(45) Date of Patent: Jul. 6, 2021

(54) INFORMATION PROCESSING APPARATUS TO DETERMINE STATE TRANSITIONS AND COMPLIMENT A DEFICIENT STATE, INFORMATION PROCESSING SYSTEM, INFORMATION PROCESSING METHOD, AND RECORDING MEDIUM

(71) Applicant: Shun Yoshimi, Kanagawa (JP)

(72) Inventor: Shun Yoshimi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/795,907

(22) Filed: Feb. 20, 2020

(65) Prior Publication Data
US 2020/0301620 A1    Sep. 24, 2020

(30) Foreign Application Priority Data

Mar. 19, 2019    (JP) .............................. JP2019-051904

(51) Int. Cl.
*G06F 3/12*    (2006.01)
(52) U.S. Cl.
CPC .......... *G06F 3/1203* (2013.01); *G06F 3/1229* (2013.01)

(58) Field of Classification Search
None
See application file for complete search history.

(56) References Cited

U.S. PATENT DOCUMENTS

| 6,295,558 B1* | 9/2001 | Davis .................. H04L 41/0663 |
| | | 709/224 |
| 2019/0289165 A1* | 9/2019 | Yoshimi .................. H04L 41/12 |

FOREIGN PATENT DOCUMENTS

JP    2012-199651    10/2012

* cited by examiner

*Primary Examiner* — Andrew H Lam
(74) *Attorney, Agent, or Firm* — Harness, Dickey & Pierce, P.L.C.

(57) ABSTRACT

An information processing apparatus includes circuitry to acquire a state of an external device intermittently from the external device, and complement a deficient state in which the state of the external device is transitioned during a polling period in which the state is not acquired, based on a state before change, a state after change that is acquired next to the state before change, and a state transition diagram of the external device.

12 Claims, 8 Drawing Sheets

| STATE BEFORE CHANGE \ STATE AFTER CHANGE | STANDBY STATE | PROCESSING STATE | STOPPED STATE | MAINTENANCE STATE |
|---|---|---|---|---|
| STANDBY STATE | NO NOTIFICATION | PROCESSING STATE | PROCESSING STATE STOPPED STATE | MAINTENANCE STATE |
| PROCESSING STATE | STANDBY STATE | NO NOTIFICATION | STOPPED STATE | MAINTENANCE STATE |
| STOPPED STATE | PROCESSING STATE STANDBY STATE | PROCESSING STATE | NO NOTIFICATION | STANDBY STATE MAINTENANCE STATE |
| MAINTENANCE STATE | STANDBY STATE | STANDBY STATE PROCESSING STATE | STANDBY STATE PROCESSING STATE STOPPED STATE | PROCESSING STATE STANDBY STATE MAINTENANCE STATE |

| PATH | NUMBER OF PATH OCCURRENCES | OCCURRENCE RATE OF PATH |
|---|---|---|
| A⇒C | 1 | 15% |
| A⇒B⇒C | 2 | 80% |
| A⇒B⇒A⇒C | 3 | 4% |
| ... | ... | ... |

INFORMATION PROCESSING APPARATUS TO DETERMINE STATE TRANSITIONS AND COMPLIMENT A DEFICIENT STATE, INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-051904, filed on Mar. 19, 2019, in the Japan Patent Office, the entire disclosure of which is hereby incorporated by reference herein.

BACKGROUND

Technical Field

The present invention relates to an information processing apparatus, an information processing system, an information processing method, and a recording medium.

Description of the Related Art

A technology has been developed for a system including a plurality of modules such as a smart device and a multi-function peripheral/product/printer (MFP) in which one of the modules (i.e., an information processing apparatus such as the smart device) is enabled to intermittently acquire, from the other module (i.e., an image forming apparatus such as the MFP), the state of the other module.

However, with the above technology, if the other module makes state transition multiple times during a polling period in which an acquisition process is performed to acquire the state of the other module, a deficiency occurs in the state of the other module acquired by the counterpart module. Thus, it has been difficult to accurately understand the state transition of the other module.

SUMMARY

Example embodiments include an information processing apparatus including circuitry, to acquire a state of an external device intermittently from the external device, and complement a deficient state in which the state of the external device is transitioned during a polling period in which the state is not acquired, based on a state before change, a state after change that is acquired next to the state before change, and a state transition diagram of the external device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an information processing apparatus, an information processing method, a program, and an image forming system are described in detail with reference to the accompanying drawings.

First Embodiment

Figure 1:
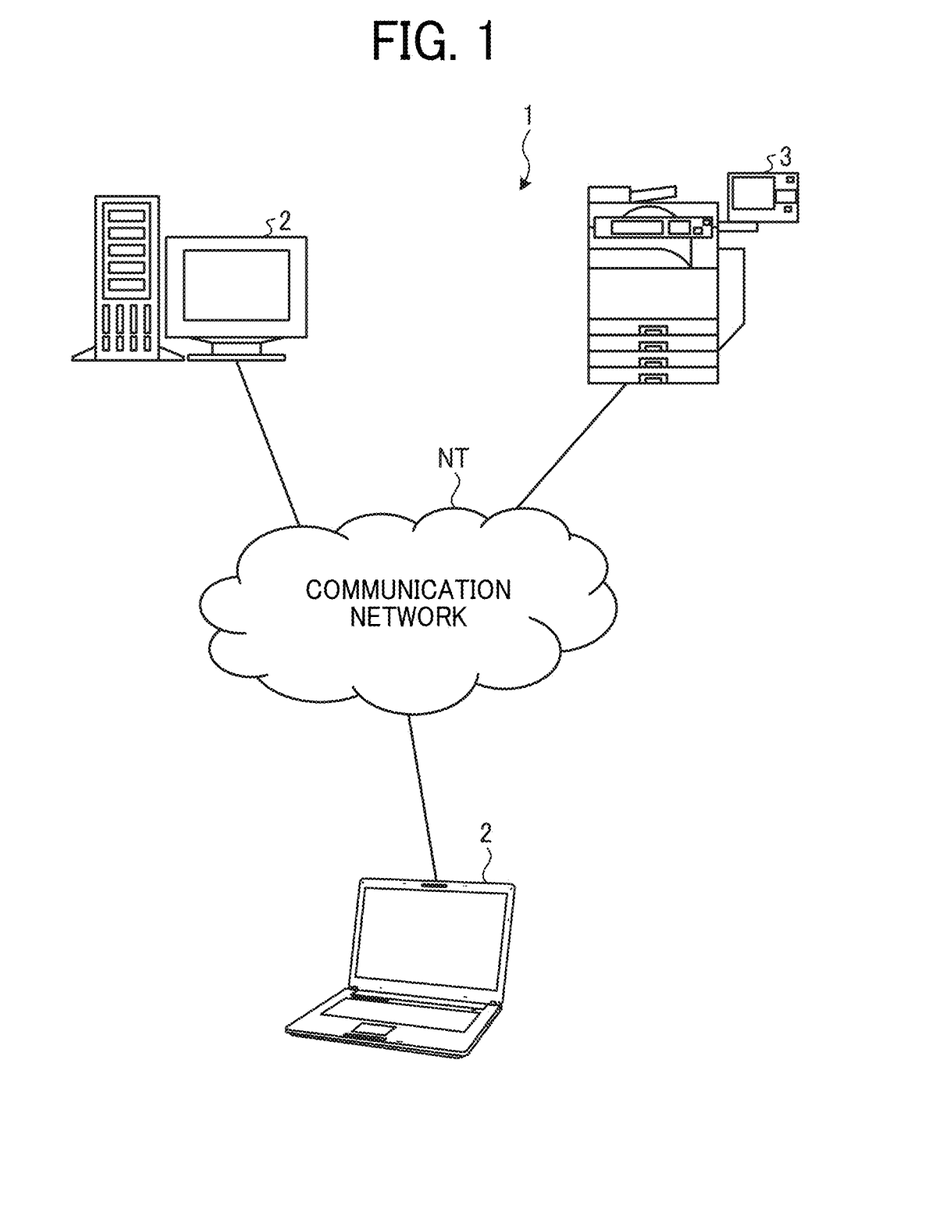
FIG. 1 is a view illustrating an example of a configuration of an image forming system according to a first embodiment.

FIG. 1 is a view illustrating an example of a configuration of an image forming system according to a first embodiment. As illustrated in FIG. 1, an image forming system 1 according to the present embodiment includes an information processing apparatus 2 and an image forming apparatus 3.

The information processing apparatus 2 and the image forming apparatus 3 are communicably connected to each other via a communication network NT such as the Internet.

Figure 2:
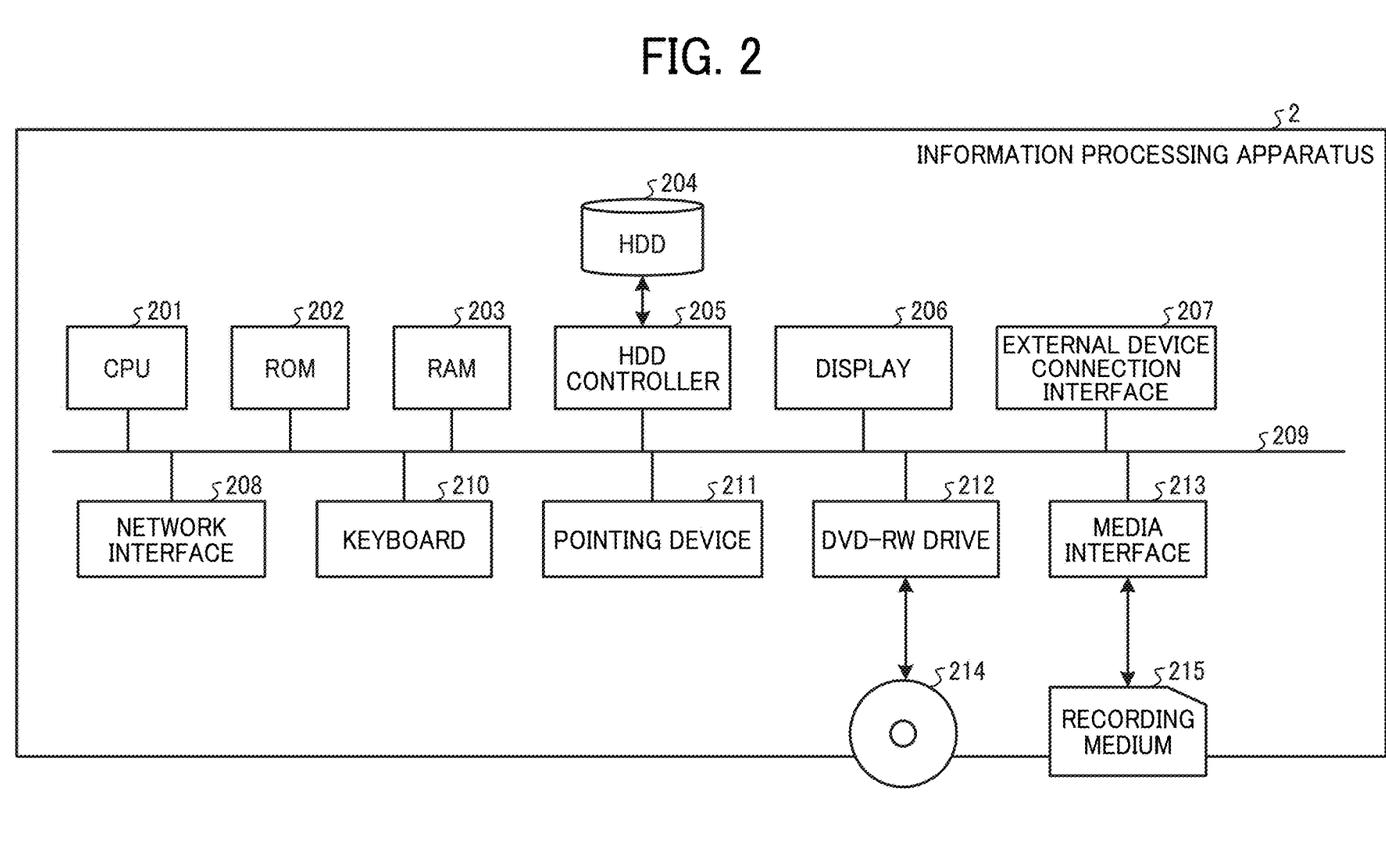
FIG. 2 is a block diagram illustrating an example of a hardware configuration of an information processing apparatus included in the image forming system according to the first embodiment.

Next, an example of a hardware configuration of the information processing apparatus 2 according to the present embodiment is described with reference to FIG. 2. FIG. 2 is a block diagram illustrating an example of the hardware configuration of the information processing apparatus included in the image forming system according to the first embodiment.

The information processing apparatus 2 is constructed by a personal computer (PC), a server, and the like. Specifically, as illustrated in FIG. 2, the information processing apparatus 2 includes a central processing unit (CPU) 201, a read only memory (ROM 202, a random access memory (RAM) 203, a hard disk drive (HDD) 204, an HDD controller 205, a display 206, an external device connection interface (I/F) 207, a network IT 208, a data bus 209, a keyboard 210, a pointing device 211, a digital versatile disk-rewritable (DVD-RW) drive 212, and a media I/F 213.

The CPU 201 controls the operation of the entire information processing apparatus 2.

The ROM 202 stores a program which is used for driving the CPU 201 such as an initial program loader (IPL).

The RAM 203 is used as a work area for the CPU 201.

The HDD 204 stores various kinds of data such as programs.

The HDD controller 205 controls reading of various kinds of data from the HDD 204 or writing various kinds of data to the HDD 204 in accordance with control by the CPU 201.

The display 206 displays various kinds of information such as a cursor, a menu, a window, characters, or an image.

The external device connection I/F 207 is an interface for connecting various external devices. Here, the external device is, for example, a universal serial bus (USB) memory or a printer.

The network I/F 208 is an interface for performing data communication by using the communication network NT.

The data bus 209 is an address bus or a data bus, etc., for electrically connecting each of the constituent elements such as the CPU 201 illustrated in FIG. 2.

The keyboard 210 is a type of input means including a plurality of keys for inputting characters, numerical values, and various instructions.

The pointing device 211 is a type of input means for selecting and executing various instructions, selecting a target of processing, moving the cursor, and the like.

The DVD-RW drive 212 controls reading or writing of various kinds of data from or to a DVD-RW 214, which is given as an example of a removable recording medium. Here, the recording medium for which reading or writing of various kinds of data is performed by the DVD-RW drive 212 is not limited to the DVD-RW 214, but may be a DVD-recordable (R) or the like.

The media UF 213 controls reading or writing (storage) of data from or to a recording medium 215 such as a flash memory.

Figure 3:
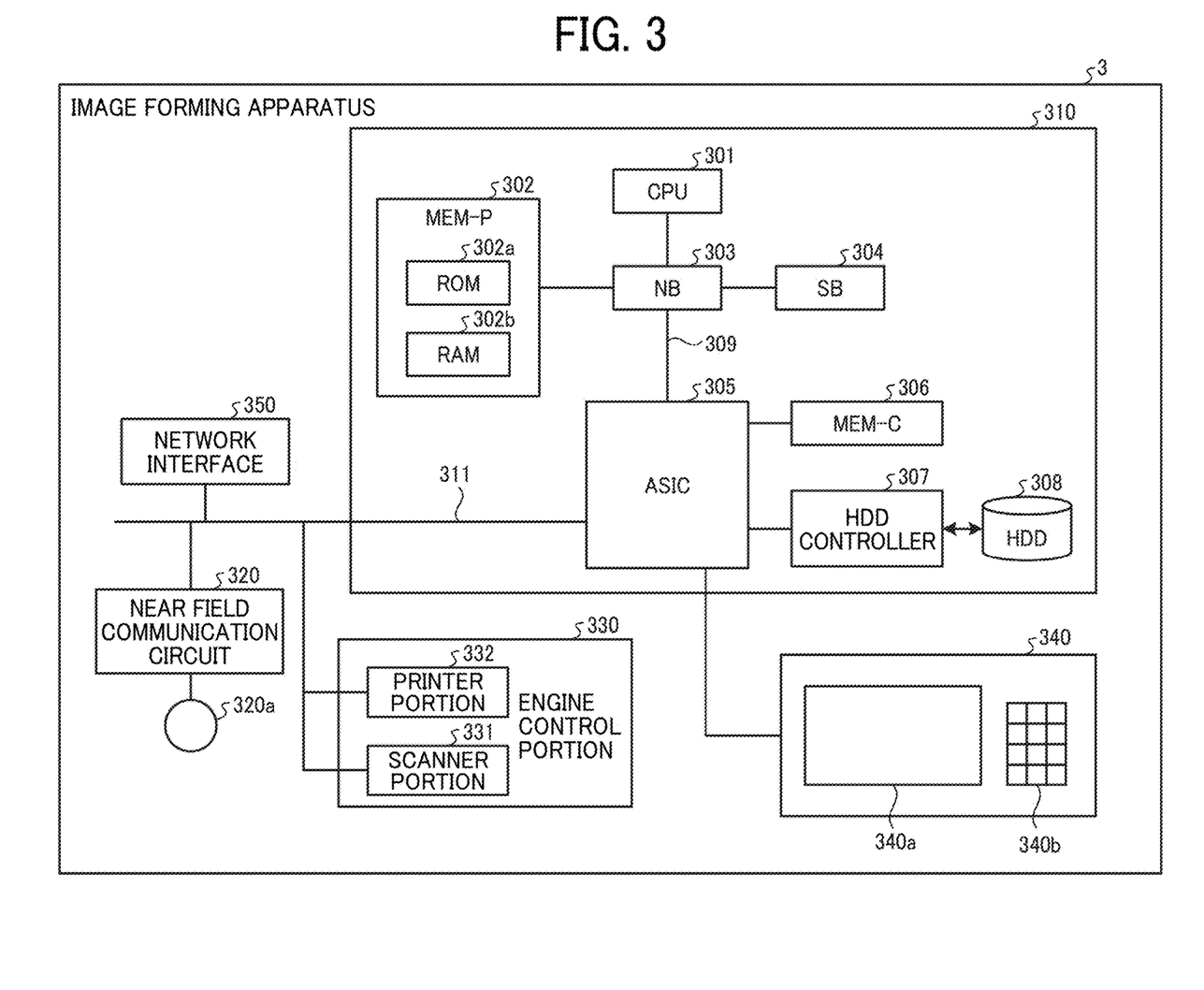
FIG. 3 is a block diagram illustrating an example of a hardware configuration of an image forming apparatus included in the image forming system according to the first embodiment.

Next, a hardware configuration of the image forming apparatus 3 according to the present embodiment is described with reference to FIG. 3. FIG. 3 is a block diagram illustrating an example of the hardware configuration of the image forming apparatus included in the image forming system according to the first embodiment.

The image forming apparatus 3 is constructed by a multifunction peripheral/product/printer (MFP), etc. The image forming apparatus 3 includes a controller 310, a near field communication circuit 320, an engine control portion 330, an operation panel 340, and a network I/F 350.

The controller 310 performs control of the entire image forming apparatus 3, and controls, for example, rendering, communication, input from the operation panel 340, and the like. Specifically, the controller 310 includes a CPU 301, which is the major part of a computer, a system memory (MEM-P) 302, a northbridge (NB) 303, a southbridge (SB) 304, an application specific integrated circuit (ASIC) 305, a local memory (MEM-C) 306, which is a storage, an HDD controller 307, and an HDD 308, which is a storage. In the controller 310, an accelerated graphics port (AGP) bus 309 connects between the NB 303 and the ASIC 305.

The CPU 301 is a control portion which performs overall control of the image forming apparatus 3.

The NB 303 is a bridge for connecting the CPU 301 to the MEM-P 302, the SB 304, and the AGP bus 309. The NB 303 includes a memory controller which controls such as reading and writing on the MEM-P 302, a peripheral component interconnect (PCI) master, and an AGP target.

The MEM-P 302 is comprised of a ROM 302a, which is a memory for storing a program or data for realizing each function of the controller 310, and a RAM 302b, which is used for developing a program or data, and as a rendering memory at the time of memory printing.

The program stored in the ROM 302a may be configured such that the program is recorded on a computer-readable recording medium such as a CD-ROM, a CD-R, or a DVD, in a file that is installed or executed, and provided.

The SB 304 is a bridge for connecting the NB 303 to a PCI device and a peripheral device.

The ASIC 305 is an integrated circuit (IC) intended for image processing including a hardware element for image processing, and serves as a bridge for connecting each of the AGP bus 309, a PCI bus 311, the HDD 308, and the MEM-C 306.

The ASIC 305 is comprised of a PCI target, an AGP master, an arbiter (ARB) constituting the core of the ASIC 305, a memory controller which controls the MEM-C 306, a plurality of direct memory access controllers (DMACs) which rotate image data by hardware logic and the like, and a PCI unit which transfers data between a scanner portion 331 and a printer portion 332 via the PCI bus 311.

To the ASIC 305, a universal serial bus (USB) interface, or an Institute of Electrical and electronics engineers (IEEE) 1394 interface may be connected.

The MEM-C 306 is a local memory to be used as a copy image buffer and a code buffer.

The HDD 308 is a storage for accumulating image data, accumulating font data for use at the time of printing, and accumulating forms. The HDD controller 307 controls reading or writing of data from or to the HDD 308 in accordance with control by the CPU 301.

The AGP bus 309 is a bus interface for graphics accelerator card proposed to increase the speed of graphic processing. With the AGP bus 309, as direct access to the MEM-P 302 at a high throughput is enabled, the speed of a graphics accelerator card is increased.

The near field communication circuit 320 is equipped with a near field communication circuit 320a. The near field communication circuit 320 is a communication circuit conforming to NFC, Bluetooth (registered trademark), or the like.

The engine control portion 330 is comprised of the scanner portion 331 and the printer portion 332. The scanner portion 331 or the printer portion 332 includes an image processing part for carrying out error diffusion, gamma conversion, and the like.

The operation panel 340 is provided with a panel display portion 340a such as a touch panel, which displays the current setting value or a selection screen, etc., and receives an input from the operator, and an operation panel 340b including a numeric keypad which receives a setting value of a condition regarding image formation, i.e., condition setting for density, for example, and a start key which receives a copy start instruction.

The image forming apparatus 3 switches and selects sequentially a document box function, a copy function, a printer function, and a facsimile function by an application switch key of the operation panel 340. When the document box function is selected, the image forming apparatus 3 is set to a document box mode. When the copy function is selected, the image forming apparatus 3 is set to a copy mode. When the printer function is selected, the image forming apparatus 3 is set to a printer mode. When the facsimile function is selected, the image forming apparatus 3 is set to a facsimile mode.

The network I/F 350 is an interface for performing data communication by using the communication network NT. The near field communication circuit 320 and the network I/F 350 are electrically connected to the ASIC 305 via the PCI bus 311.

Figure 4:
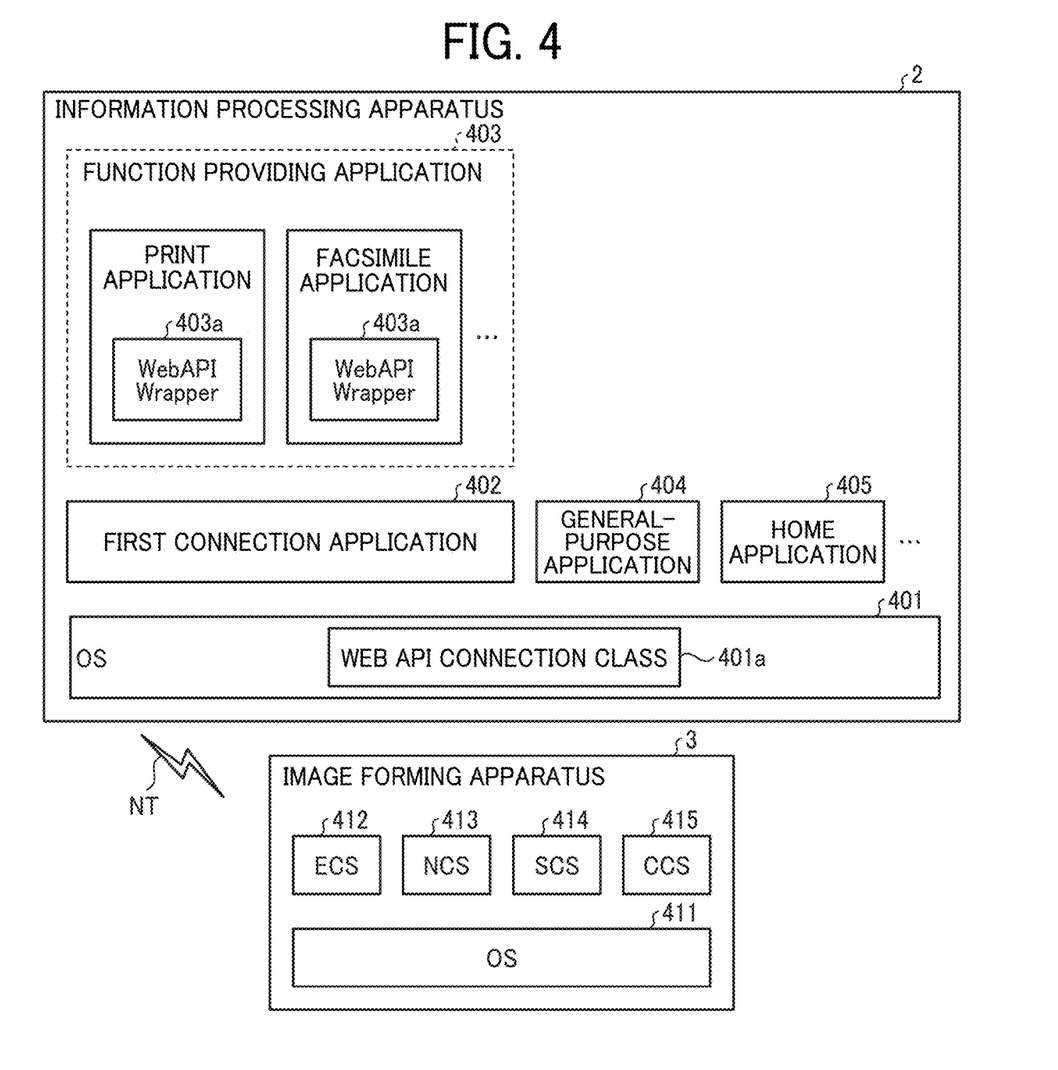
FIG. 4 is a diagram illustrating an example of functional configurations of the information processing apparatus and the image forming apparatus according to the first embodiment.

Next, an example of functional configurations of the information processing apparatus 2 and the image forming apparatus 3 according to the present embodiment is described with reference to FIG. 4. FIG. 4 is a diagram illustrating an example of the functional configurations of the information processing apparatus and the image forming apparatus according to the first embodiment.

First, the functional configuration of the information processing apparatus 2 is described with reference to FIG. 4.

As illustrated in FIG. 4, the information processing apparatus 2 includes an operating system (OS) 401, which is an operating system that provides a hardware function interface to various kinds of software, such as Android (registered trademark), a first connection application 402, at least one function providing application 403, a general-purpose application 404, and a home application 405.

The OS 401 includes a Web API connection class 401a as one function. The Web API connection class 401a may be realized by software different from the OS 401. The OS 401 may include various applications necessary for the operation of the system.

The general-purpose application 404 is a versatile application which is used in the information processing apparatus 2. An image processing application and a mail application are given as examples of the general-purpose application 404. A plurality of general-purpose applications 404 is installed in the information processing apparatus 2, and the general-purpose applications 404 may have different functions, respectively. Also, the information processing apparatus 2 may include the home application 405 as one of the general-purpose applications 404.

The home application 405 displays a main screen on the display 206 of the information processing apparatus 2. When a user performs an operation to select one of the function providing applications 403 and the general-purpose application 404 by pressing icons on the main screen, the home application 405 starts the function providing application 403 and the general-purpose application 404 corresponding to the icons that have been pressed. For example, the home application 405 starts the function providing application 403 by transmitting an instruction signal instructing a start-up to the function providing application 403 and the general-purpose application 404.

The user may start the function providing application 403 and the general-purpose application 404 desired by the user not by way of the home application 405, or may start the desired function providing application 403 from the other function providing application 403 and general-purpose application 404. Further, the home application 405 may display only the function providing application 403 on the main screen. Also, instead of providing the home application 405, a configuration in which an application other than the home application 405, such as the first connection application 402 and the function providing application 403, covers the function of the home application 405 may be employed.

In the information processing apparatus 2, a plurality of function providing applications 403 is installed. The installed function providing applications 403 may have different functions, respectively. In a case where a communication counterpart to which the information processing apparatus 2 is connected is the image forming apparatus 3, for example, the function providing application 403 corresponds to an application which provides a user interface screen for making the setting and giving an execution instruction for various functions including copy, scan, print, fax, etc., that are to be executed by the image forming apparatus 3. For example, a print application provides a user interface screen for making the setting and giving the execution instruction for the print function, and a facsimile application provides similarly a user interface screen for the facsimile function.

The function providing application 403 includes a Web API Wrapper 403a. The Web API Wrapper 403a is a library which provides a class wrapping the Web API connection class 401a, in order to enable the function providing application 403 to establish communication connection with the image forming apparatus 3 without giving consideration to the operating environment. By the above feature, as the function providing application 403 generates an instance of the Web API Wrapper 403a, the function providing application 403 acquires communication connection information regarding communication connection with the image forming apparatus 3 currently being connected (for example, the host name of a connection destination, the port number of the connection destination, etc.) from the first connection application 402. By using the acquired communication connection information, the function providing application 403 transmits an execution request of requesting execution of a function to the image forming apparatus 3.

The first connection application 402 is an application created to be installed and operated in at least the information processing apparatus 2, and establishes communication connection with the image forming apparatus 3. Also, the first connection application 402 provides the communication connection information regarding the communication connection with the image forming apparatus 3 to the Web API Wrapper 403a.

Moreover, the first connection application 402 may have a function of creating a home screen displaying a list of icons of the function providing applications 403 installed in the information processing apparatus 2, and a function of displaying a screen for selecting the image forming apparatus 3 to which the information processing apparatus 2 is to be connected, and a screen for receiving authentication information necessary for logging into the selected image forming apparatus 3.

Next, a functional configuration of the image forming apparatus 3 is described with reference to FIG. 4.

As illustrated in FIG. 4, the image forming apparatus 3 includes an independent OS 411 different from the OS of the information processing apparatus 2, an engine control service (ECS) 412, a network control service (NCS) 413, a system control service (SCS) 414, and a certification control service (CCS) 415.

The ECS 412 handles management and mediation of hardware of an image engine including the printer portion 332, the scanner portion 331 and the like.

The NCS 413 handles management and mediation of hardware of a network interface included in the image forming apparatus 3, and receives a Web API request (for example, an HTTP request and an HTTPS request) from the Web API connection class 401a.

The SCS 414 performs operation management related to the system in general such as management for power-saving recovery and job management of the image forming apparatus 3, and control of a counter, a screen, and settings.

The CCS 415 handles management of user authentication, authentication state, and usage restriction of the image forming apparatus 3.

The ECS 412, the NCS 413, the SCS 414, the CCS 415, the OS 411, and the image engine are examples of elements constituting a functional part which executes a predetermined function. Also, the functional part may include software and hardware for providing various functions including copy, scan, print, fax, and the like, apart from the elements described above.

The image forming apparatus 3 is an example of an external module (or an external device) corresponding to a communication counterpart, and the communication counterpart communicates with the information processing apparatus 2. The communication counterpart is not limited to the image forming apparatus 3, and may be various electronic devices such as office devices including an electronic blackboard and a projector. The external module of the present embodiment is a part of a device or the entire device which operates independently, and is a device which communicates with the information processing apparatus.

Figure 5:
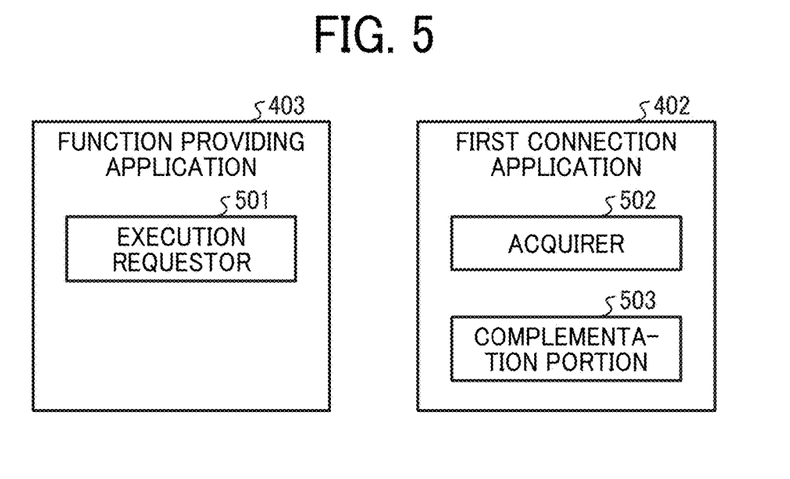
FIG. 5 is a diagram illustrating an example of characteristic functional configurations of a function providing application and a first connection application of the information processing apparatus according to the first embodiment.

Next, characteristic functions of the function providing application 403 and the first connection application 402 of the information processing apparatus 2 according to the present embodiment are described with reference to FIG. 5. FIG. 5 is a diagram illustrating an example of characteristic functional configurations of the function providing application and the first connection application of the information processing apparatus according to the first embodiment.

As illustrated in FIG. 5, the function providing application 403 includes an execution requestor 501. Also, as illustrated in FIG. 5, the first connection application 402 includes an acquirer 502 and a complementation portion 503.

The execution requestor 501 provided in the function providing application 403 receives, on the user interface screen for giving an instruction for execution of various functions (for example, copy, scan, print, and fax) of the image forming apparatus 3, an input of the function instructed for execution. Further, the execution requestor 501 transmits, to the image forming apparatus 3, an execution request for the function for which the execution instruction has been received by using the communication connection information acquired from the first connection application 402.

The acquirer 502 included in the first connection application 402 intermittently acquires the state of the image forming apparatus 3 from the image forming apparatus 3 in question. In the present embodiment, the acquirer 502 acquires the state of the image forming apparatus 3 from the image forming apparatus 3 in question at a preset interval. However, the way in which the state of the image forming apparatus 3 is acquired is not limited to the above as long as the state is acquired from the image forming apparatus 3 intermittently. For example, the acquirer 502 may acquire the state of the image forming apparatus 3 at an arbitrary timing such as a timing when acquisition of the state of the image forming apparatus 3 is instructed by the user of the information processing apparatus 2.

Here, the state of the image forming apparatus 3 refers to a state in which the image forming apparatus 3 makes a transition in accordance with the execution request received from the execution requestor 501. In the present embodiment, the state of the image forming apparatus 3 includes a standby state, a processing state, a stopped state, and a maintenance state. The standby state refers to a state in which the image forming apparatus 3 is waiting for an execution request for various functions from an external device such as the information processing apparatus 2. The processing state refers to a state in which various functions are executed in the image forming apparatus 3. The stopped state refers to a state in which execution of the various functions is suspended in the image forming apparatus 3. The maintenance state refers to a state in which maintenance of the image forming apparatus 3 is executed.

The complementation portion 503 included in the first connection application 402 serves to complement a state in which the state of the image forming apparatus 3 is transitioned (hereinafter referred to as a deficient state) during a polling period, on the basis of a state acquired at an arbitrary timing among the states acquired by the acquirer 502 (hereinafter referred to as a state before change), a state acquired by the acquirer 502 next to the state before change (hereinafter referred to as a state after change), and a state transition diagram of the image forming apparatus 3.

Consequently, even if the image forming apparatus 3 makes the state transition multiple times during a polling period in which the state of the image forming apparatus 3 is not acquired, the state in which the image forming apparatus 3 is transitioned during the polling period is possible to be complemented. As a result, it is possible to accurately understand the state transition of the image forming apparatus 3.

Here, the polling period refers to a period in which the acquirer 502 does not acquire the state. In other words, the polling period refers to a period from when the state before change is acquired to when the state after change is acquired. Also, the state transition diagram mentioned above refers to a diagram representing a transition between the states of the image forming apparatus 3 in each of the state transitions.

Further, the complementation portion 503 notifies the function providing application 403 (for example, the execution requestor 501) of the state after change acquired by the acquirer 502, and the deficient state which has been complemented. Consequently, the function providing application 403 is possible to transmit an execution request for various functions to the image forming apparatus 3 according to the acquired state of the image forming apparatus 3.

Figure 6:
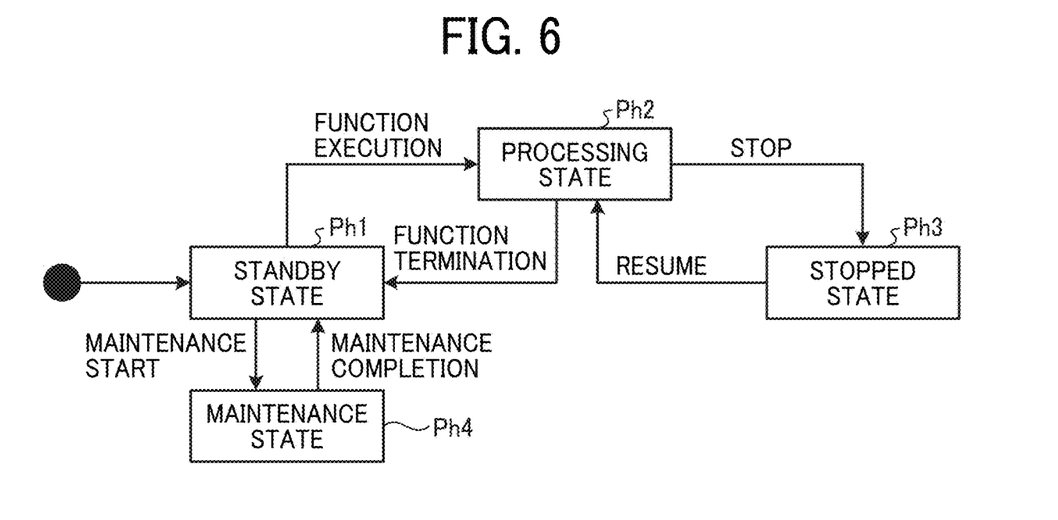
FIG. 6 is a view illustrating an example of a state transition diagram of the image forming apparatus according to the first embodiment.

Next, an example of the state transition diagram of the image forming apparatus 3 according to the present embodiment is described with reference to FIG. 6. FIG. 6 is a view illustrating an example of the state transition diagram of the image forming apparatus according to the first embodiment.

As illustrated in FIG. 6, when the image forming apparatus 3 is powered on, the image forming apparatus 3 first makes a state transition to a standby state Ph1. Then, when the image forming apparatus 3 receives an execution request for various functions (for example, copy) from an external device such as the information processing apparatus 2 in the standby state Ph1, the state of the image forming apparatus 3 is directly transitioned to a processing state Ph2. In the above, the state being directly transitioned is intended as a state transition in which, when the current state of the image forming apparatus 3 is transitioned to a certain state, the transition is carried out without going through another state. In addition to the above, when the image forming apparatus 3 receives a request for execution of maintenance from an external device in the standby state Ph1, the image forming apparatus 3 makes a state transition directly to a maintenance state Ph4. Also, when the image forming apparatus 3 is in the standby state Ph1, the state of the image forming apparatus 3 is not directly transitioned to a stopped state Ph3, but is transitioned to the stopped state Ph3 through the processing state Ph2.

Also, as illustrated in FIG. 6, when execution of the various functions is finished in the processing state Ph2, the image forming apparatus 3 directly makes a state transition to the standby state Ph1. Also, when the image forming apparatus 3 becomes unable to execute various functions due to abnormality or the like of the image forming apparatus 3 in the processing state Ph2, the image forming apparatus 3 directly makes a state transition to the stopped state Ph3. Also, when the image forming apparatus 3 is in the processing state Ph2, the state of the image forming apparatus 3 is not directly transitioned to the maintenance state Ph4, but is transitioned to the maintenance state Ph4 through the standby state Ph1.

Also, as illustrated in FIG. 6, when the image forming apparatus 3 can resume execution of the various functions by elimination of the abnormality of the image forming apparatus 3 in the stopped state Ph3, the image forming apparatus 3 directly makes a state transition to the processing state Ph2. Also, when the image forming apparatus 3 is in the stopped state Ph3, the state of the image forming apparatus 3 is not directly transitioned to the standby state Ph1, but is transitioned to the standby state Ph1 through the processing state Ph2. Further, when the image forming apparatus 3 is in the stopped state Ph3, the state of the image forming apparatus 3 is not directly transitioned to the maintenance state Ph4, but is transitioned to the maintenance state Ph4 through the processing state Ph2 and the standby state Ph1.

Also, as illustrated in FIG. 6, when the maintenance of the image forming apparatus 3 is completed in the maintenance state Ph4, the image forming apparatus 3 directly makes a state transition to the standby state Ph1. Further, when the image forming apparatus 3 is in the maintenance state Ph4, the state of the image forming apparatus 3 is not directly transitioned to the processing state Ph2, but is transitioned to the processing state Ph2 through the standby state Ph1. Furthermore, when the image forming apparatus 3 is in the maintenance state Ph4, the state of the image forming apparatus 3 is not directly transitioned to the stopped state Ph3, but is transitioned to the stopped state Ph3 through the standby state Ph1 and the processing state Ph2.

Accordingly, for example, when the state before change is the processing state Ph2 and the state after change is the maintenance state Ph4, the state transition does not occur directly from the processing state Ph2 to the maintenance state Ph4. On the basis of the above assumption, by referring to the state transition diagram illustrated in FIG. 6, the complementation portion 503 applies the standby state Ph1, which is passed through when a state transition occurs from the processing state Ph2 to the maintenance state Ph4, as the complement for the deficient state. Further, the complementation portion 503 notifies the function providing application 403 of the state transition of the image forming apparatus 3 in which the standby state Ph1 is applied as the complement for the deficient state.

Figure 7:
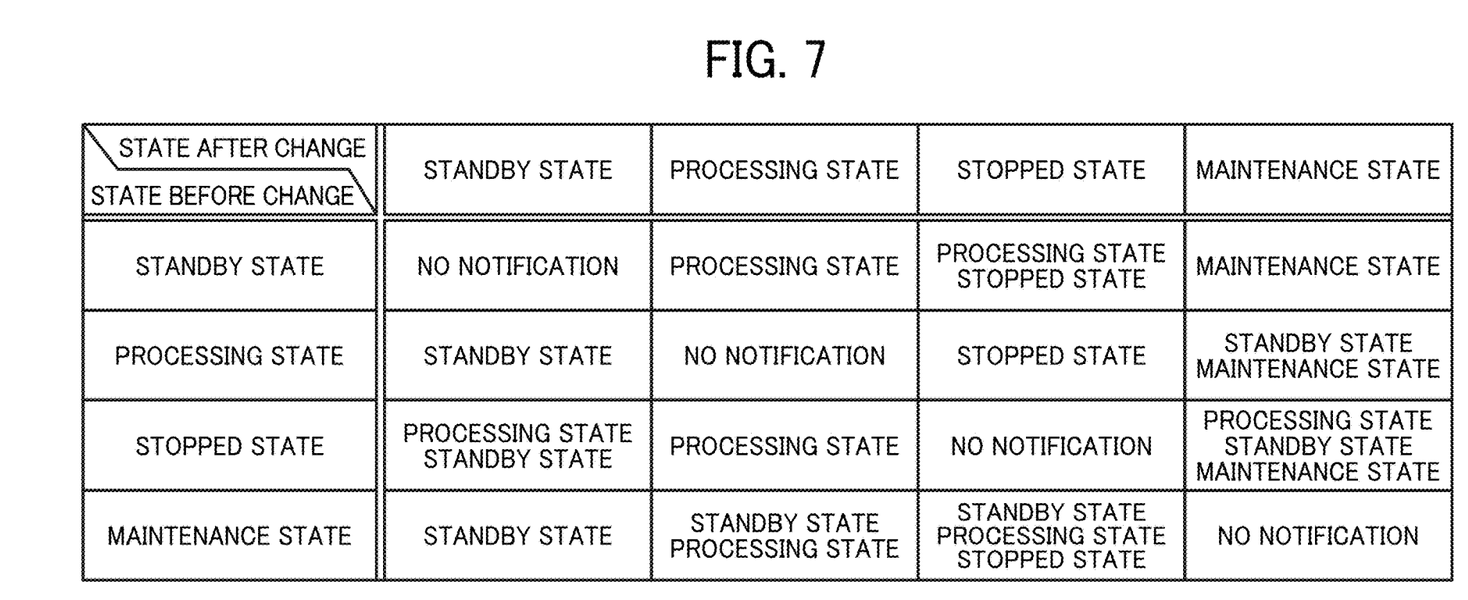
FIG. 7 is a table for explaining an example of details of a deficient state complementing process performed by the information processing apparatus according to the first embodiment.

Next, details of the deficient state complementing process performed by the information processing apparatus 2 according to the present embodiment are described with reference to FIG. 7. FIG. 7 is a table for explaining an example of the details of the deficient state complementing process performed by the information processing apparatus according to the first embodiment.

Prior to the complementation of the deficient state, the complementation portion 503 creates, as illustrated in FIG. 7, a table (hereinafter referred to as a state transition table) in which a combination of the state before change and the state after change and the state to be notified to the function providing application 403 in the combination are associated, on the basis of the state transition diagram of the image forming apparatus 3. Further, the complementation portion 503 notifies the function providing application 403 of the state by referring to the state before change and the state after change acquired by the acquirer 502, and the state transition table. (for example, the standby state), the complementation portion 503 does not perform complementation of the deficient state, and also does not notify the function providing application 403 of the state.

Further, when the state before change is the standby state Ph1, and the state after change is the processing state Ph2, the image forming apparatus 3 can make a state transition directly from the standby state Ph1 to the processing state Ph2. In the above case, there is no state that is associated with the combination of the standby state Ph1 as the state before change and the processing state Ph2 as the state after change in the state transition table. Accordingly, the complementation portion 503 does not perform complementation of the deficient state, and notifies the function providing application 403 of the processing state Ph2, which is the state after change.

Further, when the state before change is the standby state Ph1, and the state after change is the stopped state Ph3, the image forming apparatus 3 cannot make a state transition to the stopped state Ph3 without going through the processing state Ph2. In the above case, states that can be associated with the combination of the standby state Ph1 as the state before change and the stopped state Ph3 as the state after change in the state transition table are the stopped state Ph3 and the processing state Ph2. Therefore, the complementation portion 503 applies the processing state Ph2 as the complement for the deficient state. Moreover, the complementation portion 503 notifies the function providing application 403 of not only the stopped state Ph3 corresponding to the state after change, but notifies the function providing application 403 of the stopped state Ph3, which is the state after change, and the processing state Ph2 applied as the complement.

Also, when the state before change is the stopped state Ph3 and the state after change is the maintenance state Ph4, it is not possible for the image forming apparatus 3 to make a state transition to the maintenance state Ph4 without going through the standby state Ph1 and the processing state Ph2. In the above case, states that can be associated with the combination of the stopped state Ph3 as the state before change and the maintenance state Ph1 as the state after change in the state transition table are the maintenance state Ph4, the standby state Ph1, and the processing state Ph2.

Accordingly, the complementation portion 503 applies a plurality of states, more specifically, the standby state Ph1 and the processing state Ph2 as the complements for the deficient states. Moreover, the complementation portion 503 notifies the function providing application 403 of the standby state Ph1 and the processing state Ph2, which are applied as the complements, in addition to the maintenance state Ph4 corresponding to the state after change. In other words, the complementation portion 503 determines whether the image forming apparatus 3 has made a plurality of state transitions during a polling period, on the basis of the state transition diagram. Further, when the image forming apparatus 3 has made a plurality of state transitions during the polling period, the complementation portion 503 serves to complement the deficient state by the number of state transitions of the image forming apparatus 3 during the polling period.

It is assumed that the complementation portion 503 notifies the function providing application 403 of the state similarly for the other combinations of the state before change and the state after change, on the basis of the state transition table, although explanation of such notification is not given in the present specification.

Figure 8:
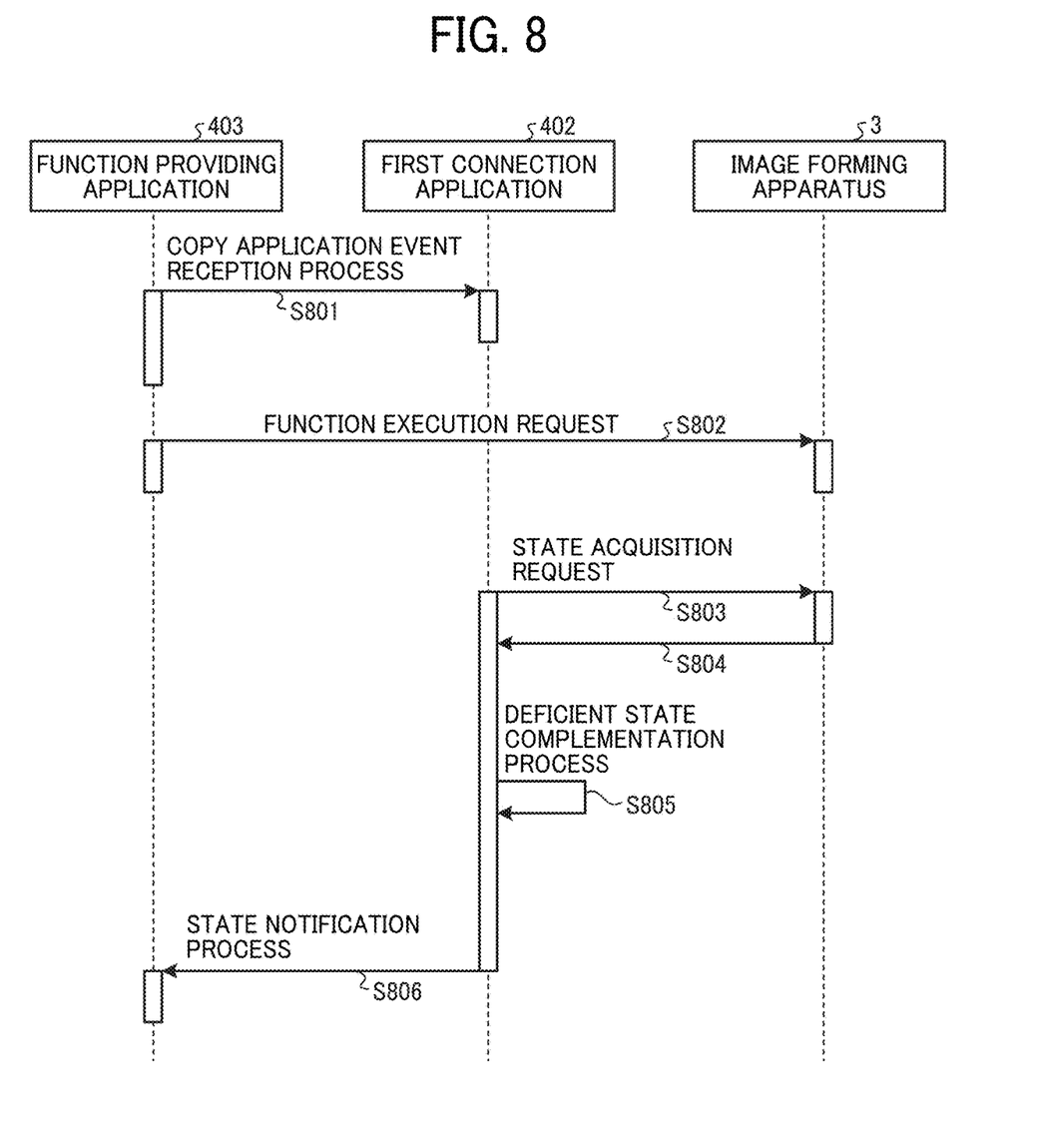
FIG. 8 is a sequence diagram illustrating an example of a flow of the deficient state complementing process in the image forming system according to the first embodiment.

Next, with reference to FIG. 8, an example of a flow of the deficient state complementing process in the image forming system 1 according to the present embodiment is described. FIG. 8 is a sequence diagram illustrating an example of the flow of the deficient state complementing process in the image forming system according to the first embodiment.

When an instruction for execution of a function of the image forming apparatus 3 (for example, copy) is input to the execution requestor 501 of the function providing application 403, the execution requestor 501 of the function providing application 403 executes an event reception process of notifying the first connection application 402 of an input of the instruction for execution of the function of the image forming apparatus 3 (step S801). Next, the execution requestor 501 transmits, to the image forming apparatus 3, an execution request for the function for which the instruction for execution has been received. (step S802).

When the acquirer 502 of the first connection application 402 is notified that the instruction for execution of the function of the image forming apparatus 3 has been input, from the function providing application 403, the acquirer 502 of the first connection application 402 intermittently transmits, to the image forming apparatus 3, an acquisition request of requesting acquisition of the state of the image forming apparatus 3 (step S803). Further, the acquirer 502 acquires the state of the image forming apparatus 3 transmitted from the image forming apparatus 3 according to the acquisition request (step S804).

Each time the state of the image forming apparatus 3 is acquired by the acquirer 502, the complementation portion 503 of the first connection application 402 determines whether the acquired state (that is, the state after change) is the same as the state acquired in the previous acquisition (that is, the state before change). If the state after change is the same as the state before change, it is very likely that the image forming apparatus 3 has not made the state transition. Therefore, the complementation portion 503 does not notify the function providing application 403 of the state of the image forming apparatus 3.

In contrast, if the state after change is different from the state before change, the complementation portion 503 determines whether the state can be directly transitioned from the state before change to the state after change, on the basis of the state transition diagram. If it is determined that the state cannot be directly transitioned from the state before change to the state after change, the complementation portion 503 serves to complement the deficient state, which is the state in which the state of the image forming apparatus 3 is transitioned during the polling period from when the state before change is acquired to when the state after change is acquired, on the basis of the state transition diagram (step S805). In doing so, the complementation portion 503 serves to complement the deficient state by the number of times the state transition of the image forming apparatus 3 is made during the polling period.

Next, the complementation portion 503 executes a state notification process of notifying the function providing application 403 of the state after change and the complemented deficient state (step S806).

As described above, according to the image forming system 1 of the first embodiment, even if the image forming apparatus 3 makes the state transition multiple times during the polling period in which the state of the image forming apparatus 3 is not acquired, the state in which the image forming apparatus 3 is transitioned during the polling period is possible to be complemented. As a result, it is possible to accurately understand the state transition of the image forming apparatus 3.

Second Embodiment

The present embodiment corresponds to an example of complementing the deficient state to be exhibited when the image forming apparatus makes a state transition through the shortest path among a plurality of paths if there exists more than one state transition path from the state before change to the state after change. In the following, explanation for configurations similar to the configurations of the first embodiment is not given.

In the present embodiment, the complementation portion 503 identifies the path of state transition from the state before change to the state after change, on the basis of the state transition diagram. Then, when the complementation portion 503 identifies a plurality of paths, the complementation portion 503 specifies the shortest path from among the plurality of paths, on the basis of the state transition diagram. The shortest path is intended as a path with the fewest number of state transitions from the state before change to the state after change. The complementation portion 503 serves to complement the deficient state to be exhibited when the image forming apparatus 3 makes a state transition through the shortest path.

Consequently, if there exists more than one path through which the image forming apparatus 3 is possible to make a state transition during the polling period in which the state of the image forming apparatus 3 is not acquired, it is possible to complement the deficient state to be exhibited when the image forming apparatus 3 makes the state transition through the shortest path.

For example, a case where the state before change is the standby state Ph1 and the state after change is the maintenance state Ph4 is assumed. In this case, the image forming apparatus 3 is possible to make a state transition directly from the standby state Ph1 to the maintenance state Ph4. Thus, it can be considered that complementing the deficient state is unnecessary. However, in a case where the polling period is long, for example, the image forming apparatus 3 may have reached the maintenance state Ph4 corresponding to the state after change, from the standby state Ph1, which is the state before change, as the start of the state transition, and by way of the processing state Ph2 and the standby state Ph1. In other words, it is difficult to uniquely identify how the state of the image forming apparatus 3 is transitioned during the polling period only from the state before change and the state after change.

Accordingly, in the present embodiment, if there exists a plurality of state transition paths from the state before change to the state after change, the complementation portion 503 serves to complement the deficient state to be exhibited when the image forming apparatus 3 makes a state transition through the shortest path among the plurality of paths.

As described above, according to the image forming system 1 of the second embodiment, if there exists more than one path through which the image forming apparatus 3 is possible to make a state transition during the polling period in which the state of the image forming apparatus 3 is not acquired, it is possible to complement the deficient state to be exhibited when the image forming apparatus 3 makes the state transition through the shortest path.

Third Embodiment

The present embodiment corresponds to an example of complementing the deficient state to be exhibited when the image forming apparatus makes a state transition through a path of which the occurrence rate is the highest among a plurality of paths if there exists more than one state transition path from the state before change to the state after change. In the following, explanation for configurations similar to the configurations of the first embodiment is not given.

In the present embodiment, the HDD 204 stores the occurrence rate of each path for each of the state transition paths of the image forming apparatus 3 from the state before change to the state after change.

In the present embodiment, the complementation portion 503 identifies the path of state transition from the state before change to the state after change, on the basis of the state transition diagram. Then, when the complementation portion 503 identifies a plurality of paths, the complementation portion 503 specifies the path of which the occurrence rate is the highest from among the plurality of paths, on the basis of the occurrence rate of each path stored in the HDD 204. The complementation portion 503 serves to complement the deficient state to be exhibited when the image forming apparatus 3 makes a state transition through a path of which the occurrence rate is the highest.

As a result, if there exists more than one path through which the image forming apparatus 3 is possible to make a state transition during the polling period in which the state of the image forming apparatus 3 is not acquired, it is possible to complement the deficient state to be exhibited when the image forming apparatus 3 makes the state transition through a path with the highest possibility of occurrence. Thus, the accuracy of the deficient state complementation can be improved.

Figure 9:
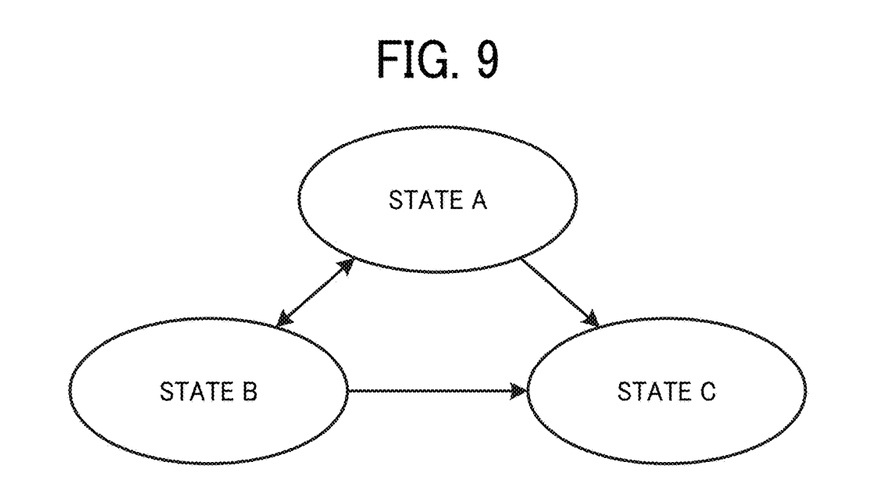
FIG. 9 is a view illustrating an example of a state transition diagram of an image forming apparatus according to a third embodiment.
Figure 10:
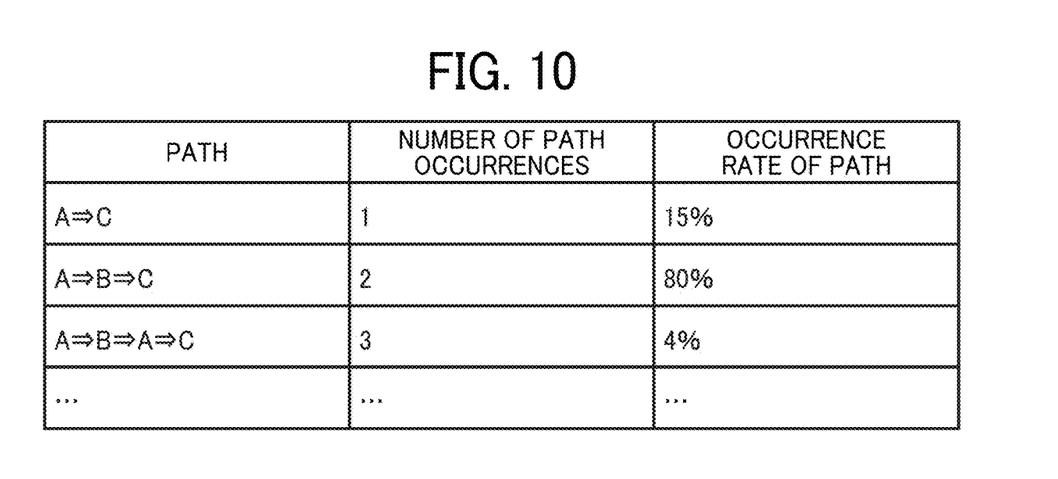
FIG. 10 is a view illustrating an example of an occurrence rate table stored by an information processing apparatus according to the third embodiment.

Next, an example of the deficient state complementing process performed by the information processing apparatus 2 according to the present embodiment is described with reference to FIGS. 9 and 10. FIG. 9 is a view illustrating an example of the state transition diagram of the image forming apparatus according to the third embodiment. FIG. 10 is a view illustrating an example of an occurrence rate table stored by the information processing apparatus according to the third embodiment.

In the present embodiment, as illustrated in FIG. 10, for each of paths P1 to Pn (hereinafter stated as path P if paths P1 to Pn do not need to be distinguished from each other) through which the image forming apparatus 3 makes a state transition from the state before change to the state after change, the HDD 204 stores the number of path occurrences in each of the paths P, and the occurrence rate of each of the paths P.

For example, when the image forming apparatus 3 makes a state transition according to the state transition diagram illustrated in FIG. 9, if the state before change is state A and the state after change is state C, the complementation portion 503 identifies a plurality of paths P1 to Pn as the path P through which the image forming apparatus 3 makes the state transition from state A to state C.

For example, path P1 is a path through which the state transition is made directly from state A to state C. Further, path P2 is a path through which the state transition is made in the order of state A, state B, and state C. Furthermore, path P3 is a path through which the state transition is made in the order of state A, state B, state A, and state C.

Then, the complementation portion 503 specifies the deficient state (state B illustrated in FIG. 8) to be exhibited when the image forming apparatus 3 makes a state transition according to the path (for example, path P2) of which the occurrence rate is the highest stored in the HDD 204 from among the identified paths P1 to P3.

As described above, according to the image forming system 1 of the third embodiment, if there exists more than one path through which the image forming apparatus 3 is possible to make a state transition during the polling period in which the state of the image forming apparatus 3 is not acquired, it is possible to complement the deficient state to be exhibited when the image forming apparatus 3 makes the state transition through a path with the highest possibility of occurrence. Thus, the accuracy of the deficient state complementation is possible to be improved.

Fourth Embodiment

The present embodiment corresponds to an example in which each of a plurality of applications is notified of the complemented deficient state when the information processing apparatus is to execute the plurality of applications. In the following, explanation for configurations similar to the configurations of the above-described embodiments is not given.

In the present embodiment, when the information processing apparatus 2 executes a plurality of applications including the function providing application 403, in addition to the first connection application 402, the complementation portion 503 notifies the plurality of applications of the complemented deficient state. The above feature eliminates the need to implement the function of complementing the deficient state for all the applications executed in the information processing apparatus 2. Accordingly, it becomes possible to facilitate development of the applications executed in the information processing apparatus 2. Here, it is assumed that the plurality of applications are applications required to monitor the state of the image forming apparatus 3.

As described above, according to the image forming system 1 of the fourth embodiment, there is no need to implement the function of complementing the deficient state for all the applications executed in the information processing apparatus 2. Accordingly, it becomes possible to facilitate development of the applications executed in the information processing apparatus 2.

Fifth Embodiment

The present embodiment corresponds to an example in which when the image forming apparatus includes a storage which stores the states to be exhibited during the polling period, the state acquired from the storage is applied as the complement for the deficient state. In the following, explanation for configurations similar to the configurations of the above-described embodiments is not given.

In the present embodiment, the storage such as the HDD 308 of the image forming apparatus 3 stores the state in which the state of the image forming apparatus 3 is transitioned during the polling period.

In the present embodiment, the acquirer 502 acquires the state in which the state of the image forming apparatus 3 is transitioned during the polling period from the HDD 308 of the image forming apparatus 3. Then, the complementation portion 503 applies the state acquired from the HDD 308 of the image forming apparatus 3 as the complement for the deficient state during the polling period.

As described above, according to the image forming system 1 of the fifth embodiment, the deficient state is complemented on the basis of the state of actual state transition of the image forming apparatus 3 during the polling period. Thus, the accuracy of the deficient state complementation is improved.

Each of the functions of the embodiments described above (for example, the execution requestor 501 of the function providing application 403, and the acquirer 502 and the complementation portion 503 of the first connection application 402) is realized by one or more processing circuits. It is assumed that the "processing circuit" in the present specification includes a processor programmed to execute each of the functions by software, such as a processor mounted by using an electronic circuit, an application specific integrated circuit (ASIC) designed to execute each of the functions described above, a digital signal processor (DSP), a field programmable gate array (FPGA), and a device such as a conventional circuit module.

The program to be executed by the information processing apparatus 2 of the present embodiment is recorded on a computer-readable recording medium such as a CD-ROM, a flexible disk (FD), a CD-R, or a DVD, in a file that is installed or executed, and provided.

Also, the program to be executed by the information processing apparatus 2 of the present embodiment may be configured such that the program is stored on a computer connected to a network such as the Internet, and provided through a download via the network. Further, the program to be executed by the information processing apparatus 2 of the present embodiment may be configured such that the program is provided or distributed via a network such as the Internet.

Furthermore, the program to be executed by the information processing apparatus 2 of the present embodiment may be configured such that the program is provided by being preinstalled in a ROM or the like. The program to be executed by the information processing apparatus 2 of the present embodiment has a module structure including the elements described above (i.e., the execution requestor 501, the acquirer 502, and the complementation portion 503). As the CPU 201 (processor), as the actual hardware, reads the program from the recording medium and executes the read program, the above elements are loaded into a main storage, and the execution requestor 501, the acquirer 502, and the complementation portion 503 are to be generated on the main storage.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising circuitry, the circuitry being configured to:
acquire a state of an external device intermittently from the external device;
complement a deficient state in which the state of the external device is transitioned during a polling period in which the state is not acquired, based on a state before change, a state after change that is acquired next to the state before change, and a state transition diagram of the external device;
determine, based on the state transition diagram, whether a plurality of state transitions are made by the external device during the polling period; and
complement, when the circuitry determines that the plurality of state transitions are made by the external device during the polling period, the deficient state by a number of the plurality of state transitions of the external device during the polling period.

2. The information processing apparatus according to claim 1, wherein when a plurality of paths of state transition from the state before change to the state after change exist, the circuitry is configured to complement the deficient state to be exhibited when the external device makes a state transition through a shortest path among the plurality of paths.

3. The information processing apparatus according to claim 1, wherein when a plurality of paths of state transition from the state before change to the state after change exist, the circuitry is configured to complement the deficient state to be exhibited when the external device makes a state transition through a path of which an occurrence rate is the highest among the plurality of paths.

4. The information processing apparatus according to claim 1, wherein:
the circuitry executes a plurality of applications; and
the circuitry further notifies each of the plurality of applications of the deficient state complemented.

5. The information processing apparatus according to claim 1, wherein when the external device includes a memory that stores the state of the external device during the polling period,
the circuitry acquires the state of the external device during the polling period from the memory, and applies the state acquired as a complement for the deficient state.

6. An image forming system comprising:
the information processing apparatus according to claim 1; and
an image forming apparatus that operates as an external device.

7. An information processing method executed by an information processing apparatus, the method comprising:

acquiring a state of an external device intermittently from the external device;

complementing a deficient state in which the state of the external device is transitioned during a polling period in which the state is not acquired, based on a state before change, a state after change which is acquired next to the state before change, and a state transition diagram of the external device;

determining, based on the state transition diagram, whether a plurality of state transitions are made by the external device during the polling period; and complementing, when the circuitry determines that the plurality of state transitions are made by the external device during the polling period, the deficient state by a number of the plurality of state transitions of the external device during the polling period.

8. The information processing method according to claim 7, further comprising, when a plurality of paths of state transition from the state before change to the state after change exist, complementing the deficient state to be exhibited when the external device makes a state transition through a shortest path among the plurality of paths.

9. The information processing method according to claim 7, further comprising, when a plurality of paths of state transition from the state before change to the state after change exist, complementing the deficient state to be exhibited when the external device makes a state transition through a path of which an occurrence rate is the highest among the plurality of paths.

10. A non-transitory recording medium storing a program which, when executed by one or more processors, cause the one or more processors to perform an information processing method comprising:

at an information processing apparatus, acquiring a state of an external device intermittently from an external device;

at the information processing apparatus, complementing a deficient state in which the state of the external device is transitioned during a polling period in which the state is not acquired, based on a state before change, a state after change which is acquired next to the state before change, and a state transition diagram of the external device;

at the information processing apparatus, determining, based on the state transition diagram, whether a plurality of state transitions are made by the external device during the polling period; and at the information processing apparatus, complementing, when the circuitry determines that the plurality of state transitions are made by the external device during the polling period, the deficient state by a number of the plurality of state transitions of the external device during the polling period.

11. The non-transitory recording medium of claim 10, storing the program which, when executed by the one or more processors, cause the one or more processors to perform the information processing method further including, when a plurality of paths of state transition from the state before change to the state after change exist, complementing the deficient state to be exhibited when the external device makes a state transition through a shortest path among the plurality of paths.

12. The non-transitory recording medium of claim 10, storing the program which, when executed by the one or more processors, cause the one or more processors to perform the information processing method further including, when a plurality of paths of state transition from the state before change to the state after change exist, complementing the deficient state to be exhibited when the external device makes a state transition through a path of which an occurrence rate is the highest among the plurality of paths.

* * * * *